(12) United States Patent
Bostetter et al.

(10) Patent No.: US 9,558,671 B2
(45) Date of Patent: Jan. 31, 2017

(54) METHOD AND A DEVICE FOR AIDING THE GUIDANCE OF AN AIRCRAFT

(71) Applicant: Airbus Operations (S.A.S.), Toulouse (FR)

(72) Inventors: Stephane Bostetter, Toulouse (FR); Maxime Wachenheim, Toulouse (FR); Boris Kozlow, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 61 days.

(21) Appl. No.: 14/068,809

(22) Filed: Oct. 31, 2013

(65) Prior Publication Data

US 2014/0136101 A1    May 15, 2014

(30) Foreign Application Priority Data

Nov. 12, 2012  (FR) ...................................... 12 60723

(51) Int. Cl.
*G08G 5/00* (2006.01)
*G01C 21/20* (2006.01)
*G01C 23/00* (2006.01)

(52) U.S. Cl.
CPC ............. *G08G 5/0052* (2013.01); *G01C 21/20* (2013.01); *G01C 23/00* (2013.01); *G08G 5/003* (2013.01)

(58) Field of Classification Search
CPC ............... G08G 5/0052; G08G 5/003–5/0039; G01C 21/20; G01C 23/00
See application file for complete search history.

(56) References Cited

U.S. PATENT DOCUMENTS

| | | | |
|---|---|---|---|
| 6,405,124 B1 * | 6/2002 | Hutton | G01C 21/00 701/122 |
| 7,765,061 B1 * | 7/2010 | Barber et al. | 701/467 |

OTHER PUBLICATIONS

Math Word Problems for Dummies, John Wiley & Sons, Feb. 5, 2008.*
French Search Report for Application No. FR 1260723 dated Aug. 8, 2013.

* cited by examiner

*Primary Examiner* — Courtney Heinle
(74) *Attorney, Agent, or Firm* — Jenkins, Wilson, Taylor & Hunt, P.A.

(57) ABSTRACT

Method and device for aiding the guidance of an aircraft having to comply with at least one time constraint. The device can determine and present on a screen of the flight deck an offset in distance ($\Delta D$) between the aircraft (AC) and a reference aircraft (Aref) which is defined to fly along the flight plan (TV) at an optimal speed to comply with the time constraint.

9 Claims, 1 Drawing Sheet

METHOD AND A DEVICE FOR AIDING THE GUIDANCE OF AN AIRCRAFT

CROSS-REFERENCE TO RELATED APPLICATION

This application claims priority to French Patent Application No. 12 60723 filed on Nov. 12, 2012, the entire content of which is incorporated by reference herein.

TECHNICAL FIELD

The present invention relates to a method and a device for aiding the guidance of an aircraft which must comply with at least one time constraint.

Within the framework of the present invention, a time constraint is considered to be a constraint which requires a given passing time, of RTA ("Required Time of Arrival") type, at a particular waypoint of the flight trajectory followed by the aircraft.

BACKGROUND

The invention pertains to the field of navigation and relates to a flight management functionality relating especially to a flight management system of FMS type. This system allows flight planning, management and prediction in both the horizontal and vertical plane. In particular, the invention targets the flight predictions associated with constraints. A constraint is an input of the pilot or of the air traffic controller (typically the altitude, the speed, a time, etc. at a point of the flight plan) that the aircraft must comply with. Constraints serve especially within the framework of air traffic regulation for civil aircraft.

SUMMARY

Aircraft are capable of managing a time constraint by altering their speed. The flight management system (FMS) must be able to ensure the function of the adherence to a time constraint at a given point. With this aim, it will calculate the optimal parameters, especially in terms of speed, so as to reach the specified points at the envisaged time. A speed strategy must be defined along the flight plan so as to optimize arrival at the constraint.

The FMS system carries out its predictions by comparing the RTA time constraint, with the estimated time of arrival ETA which is directly related to the speed. If the estimated time of arrival is less than the time constraint, a speed profile is recalculated to slow the aircraft, and vice versa, the aim being to make the estimated time of arrival ETA converge towards the RTA constraint.

In addition to the calculation of optimal speed, the system also makes it possible to inform the pilot of the state of the constraint (late, early, successful or missed) by calculating the temporal deviation between the RTA constraint and the estimated time of arrival ETA. This allows the crew to know at any moment how things are going with the constraint and thus to have the possibility of managing the speed of the aircraft themselves.

It is known that time constraint adherence requirements are increased for military aircraft, such as military transport aeroplanes, for which the margins to be complied with are generally restricted and usually of the order of a few seconds.

The drawback of taking an RTA constraint into account is due to the fact that the calculation of the speed profile uses a large part of the calculation capabilities of the FMS system. The previously described process for calculating predictions is an iterative loop allowing convergence, but which demands high capability from the computer used.

In the case of the management of the RTA constraints, the benchmark used is always the same: the basis is the time constraint itself, as well as the estimated time of the aircraft at the point associated with the constraint in order to calculate a deviation a temporal contingency so as to determine whether the aircraft is complying with the RTA constraint, or is late or early.

Moreover, there often exist in flight plans segments on which it is planned that the aircraft will fly at constant speed. This is especially the case with military aircraft where tactical functions (drops, refuelling, etc.) generally require particular speeds. On these segments, the FMS system is therefore compelled to make a constant speed assumption. The calculation of the optimal speed is therefore carried out in such a way that, on segments of this type, the optimal speed is equal to the constant speed of the segment. Between two segments of this type, the speed (or speed objective) is recalculated so as to try to satisfy the time constraint.

The object of the present invention is to remedy the aforementioned drawbacks. It relates to a method for aiding the guidance of an aircraft having to comply with at least one time constraint requiring a given passing time at a particular waypoint of a flight plan of the aircraft. The aim of the said method for aiding guidance is to provide the pilot with indications making it possible to inform him of the aircraft's adherence to the time constraint, doing so using restricted calculation capabilities.

For this purpose, according to the invention, the said method is noteworthy in that, in an automatic manner:

a reference speed which illustrates an optimal theoretical flight speed along the said flight plan is determined, making it possible to comply with the said time constraint;

a fictitious aircraft is determined, termed the reference aircraft, which is assumed to fly along the said flight plan at the said reference speed, beginning to fly at the same instant and the same position as the said aircraft to be guided;

the current offset in distance of the said aircraft to be guided, in the course of its flight along the said flight plan, with respect to the said reference aircraft is determined, in a repetitive manner, on the aircraft to be guided; and at least one means of indication making it possible to indicate to a crew member of the said aircraft (to be guided) at least the said current offset in distance, is presented on a viewing screen of the said aircraft to be guided.

This current offset therefore affords an indication regarding compliance or non-compliance with the time constraint. Thus:

if the offset is zero, that is to say if the aircraft to be guided is situated at the (theoretical) position of the reference aircraft (and if it complies with the planned and optimal speeds), the time constraint is complied with;

if the offset is non-zero and the aircraft to be guided is situated to the rear of the position of the reference aircraft, the time constraint is not complied with and the aircraft to be guided must accelerate to satisfy the constraint; and if the offset is non-zero and the aircraft to be guided is situated in front of the position of the reference aircraft, the time constraint is not complied with and the aircraft to be guided must decelerate to satisfy the constraint.

Thus, by virtue of the determination of a reference (reference aircraft) and the calculation of a deviation in distance with respect to this reference, it is possible to indicate to the crew, via the display of an indication illustrating this deviation in distance, whether the aircraft is early or late, so that it can if appropriate perform the necessary corrective actions (accelerate or slow down).

Consequently, to implement the invention, a change of benchmark is performed to verify compliance with the time constraint. Indeed, the present invention is no longer based directly on the time constraint to ascertain whether the aircraft must accelerate or slow down as in the case of the customary solutions, but on a reference aircraft which is displaced along the flight plan. In addition to this change of benchmark, the invention is no longer based on a temporal deviation but on a spatial deviation (current offset in distance) with respect to this reference.

Moreover, to determine the displacement of this reference aircraft, it suffices to calculate the reference speed just once (which is applied to the reference aircraft), and not in a repetitive manner as in the customary solutions. Consequently, through this single calculation of the reference speed (except in the case of modification of the flight plan, as specified hereinbelow), the calculation capability required to implement the invention and afford aid with the guidance of the aircraft is greatly reduced.

Furthermore, to afford additional information, at least one auxiliary means of indication indicating the said reference speed is presented, moreover, on the viewing screen.

Advantageously:
the current speed Vac of the aircraft to be guided is determined in a repetitive manner; and
the said current offset $\Delta D$ is calculated with the aid of the following expression:

$$\Delta D = (1 - Vac/Vref) * Dref$$

in which:
Vref represents the optimal theoretical flight speed along the flight plan, from an initial position to a terminal position, making it possible to comply with the said time constraint; and
Dref represents the distance traversed at the current instant by the reference aircraft from the said initial point along the said flight plan.

It will be noted that, within the framework of the present invention, the offset $\Delta D$ is a value of deviation variation, and not the distance separating the two aircraft. Thus, to obtain this distance, it is appropriate to integrate $\Delta D$ with respect to time.

Moreover, within the framework of the present invention, the said distance Dref can be calculated in various ways.

In particular, in a first embodiment, the said distance Dref is determined with the aid of the following expression:

$$Dref = Vref \times tc$$

in which tc represents the current time, counted from the passing of the said initial point by the reference aircraft.

Furthermore, in a second embodiment, the said distance Dref is determined with the aid of the following expression:

$$Dref = Dtot - Drest$$

in which:
Dtot represents the total distance along the flight plan between the said initial and terminal positions; and
Drest represents the distance remaining to be traversed by the reference aircraft along the said flight plan, from its current position, in order to reach the said terminal position.

Advantageously, for a flight plan comprising constant-speed segments, the said reference speed exhibits one of the following characteristics:
it is constant between an initial position and a terminal position;
it is constant per segment, on segments of the flight plan.

Moreover, in the case of modification of the flight plan, a new reference speed is determined and is thereafter taken into account to determine the offset in distance.

The present invention also relates to a device for aiding the guidance of an aircraft having to comply with at least one time constraint requiring a given passing time at a particular waypoint of a flight plan.

According to the invention, the said device is noteworthy in that it is stowed onboard the aircraft to be guided and comprises:
means for automatically determining a reference speed which illustrates an optimal theoretical flight speed along the said flight plan making it possible to comply with the said time constraint;
means for automatically determining, in a repetitive manner, in the course of the flight of the aircraft to be guided, a current offset in distance with respect to a reference aircraft, the said reference aircraft being a fictitious aircraft which is assumed to fly along the said flight plan at the said reference speed, beginning to fly at the same instant and the same position as the said aircraft to be guided; and
display means for automatically presenting, on a viewing screen, at least one means of indication making it possible to indicate to a crew member of the aircraft, the said current offset in distance.

This device can form part of a customary system intended to manage a time constraint and comprising especially means for inputting data, a set of information sources and a flight management system, as specified hereinbelow.

The present invention also relates to an aircraft, in particular a civil or military, transport aeroplane which comprises a device or a system such as that aforementioned.

BRIEF DESCRIPTION OF THE DRAWINGS

The figures of the appended drawing will elucidate the manner in which the invention may be embodied. In these figures, identical references designate similar elements.

DETAILED DESCRIPTION

Figure 1:
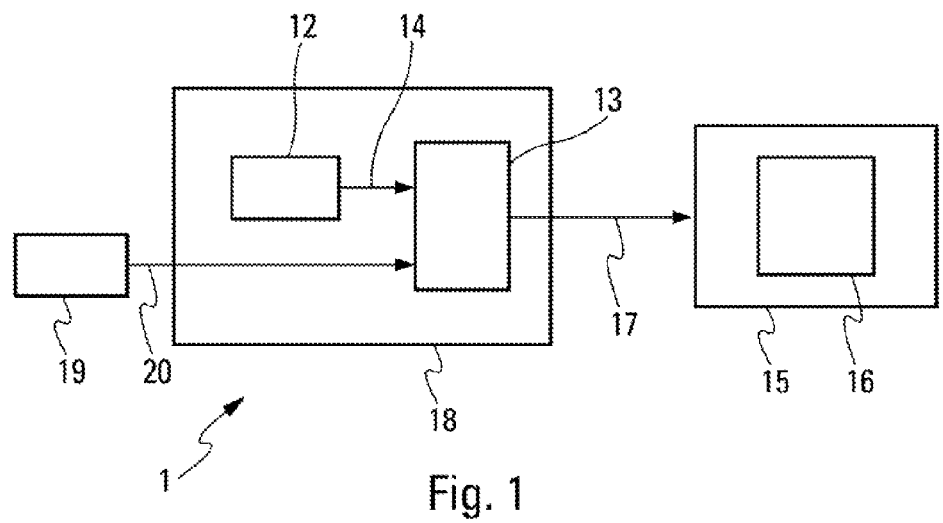
FIG. 1 is the schematic diagram of a device for aiding guidance in accordance with the invention.

The device 1 in accordance with the invention and represented schematically in FIG. 1 is intended to aid the pilot of an aircraft AC to guide it during a flight along a flight trajectory TV which passes through waypoints (P0, P1, P2, and P3 in the example of FIG. 2) and which complies with a flight plan. This aircraft AC, for example a civil or military, transport aeroplane must comply with at least one time constraint during this flight.

Within the framework of the present invention, a time constraint is considered to be a constraint which requires a given passing time, of RTA ("Required Time of Arrival") type, at a particular waypoint (for example at the point P3) of the flight trajectory TV followed by the aircraft A.

Figure 3:
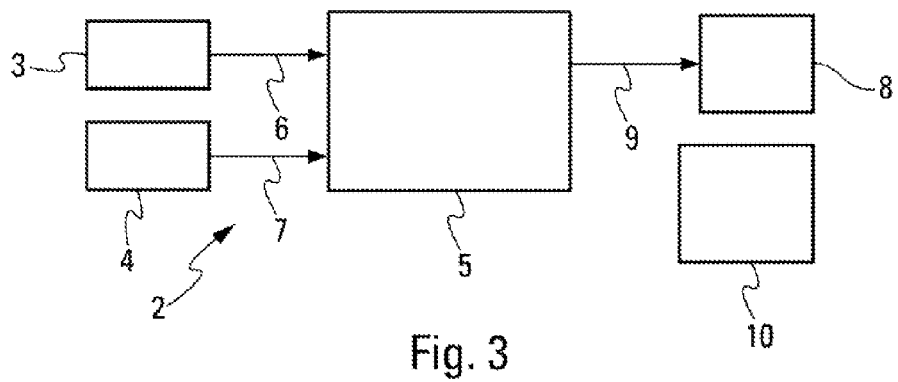
FIG. 3 is the schematic diagram of a system for managing a time constraint.

To allow an aircraft AC to comply with such a time constraint, the aircraft AC is generally provided with an onboard appropriate customary system 2. This system 2 generally comprises, as represented in FIG. 3, in a customary manner, at least:
- means 3, for example a keyboard, allowing an operator, in particular a pilot of the aircraft AC, to input at least one time constraint of RTA type, which therefore indicates a passing time required at a particular waypoint (for example at the point P3), that the aircraft AC must adhere to during a flight;
- a set 4 of information sources which are able to determine the values of parameters, such as the wind, the temperature or the position of the aircraft AC, which relate to the flight of the said aircraft AC; and
- a flight management system 5, for example of FMS type, which is connected by way of links 6 and 7 respectively to the said means 3 and to the said set 4, which receives information from them, and which determines especially speed setpoints which, when they are applied to the aircraft AC during the flight along the said flight trajectory TV, allow it to pass the said waypoint P3 at the required passing time.

This system 2 comprises, generally, moreover:
- display means 8 which are connected by way of a link 9 to the said flight management system 5 and which can especially exhibit to the pilot information relating to the guidance of the aircraft AC, and in particular the said speed setpoints; and
- a customary guidance system 10 which allows the pilot to guide the aircraft AC along the said flight trajectory TV, by applying to it the speed setpoints determined by the flight management system 5.

The said guidance system 10 comprises, especially, customary means of actuation (not represented) of control members of the aircraft A, which are able to act on the flight of the aircraft AC, for example control surfaces (lateral, elevational, roll) and engines. The said actuation means receive orders which are such that the aircraft AC follows especially the said aforementioned speed setpoints.

According to the invention, to aid the pilot to manage a time constraint of the aircraft AC, the said device 1 of automatic type, which is stowed onboard the aircraft AC, comprises, as represented in FIG. 1:
- means 12 for automatically determining a reference speed Vref which illustrates an optimal theoretical flight speed along the said flight plan (trajectory TV) making it possible to comply with the said time constraint (at the point P3);
- means 13 which are connected by way of a link 14 to the said means 12 and which are formed so as to determine, in a repetitive manner, in the course of the flight of the aircraft AC, a current offset in distance ΔD of the latter with respect to a reference aircraft Aref. According to the invention, the said reference aircraft Aref is a fictitious aircraft which is assumed to fly along the said flight plan at the said reference speed Vref, beginning to fly at the same instant and the same position (for example at the said point P0) as the said aircraft AC; and
- display means 15 which are connected by way of a link 17 to the said means 13 and which are formed so as to present, on a viewing screen 16, at least one means of indication (not represented) making it possible to indicate the said current offset in distance ΔD.

This means of indication can be represented in diverse ways, for example with the reference appearing on the navigation screens or with a scale with cursor accounting for the magnitude of the deviation. Within the framework of the present invention, any type of display making it possible to indicate this offset to a crew member is conceivable.

Figure 2:
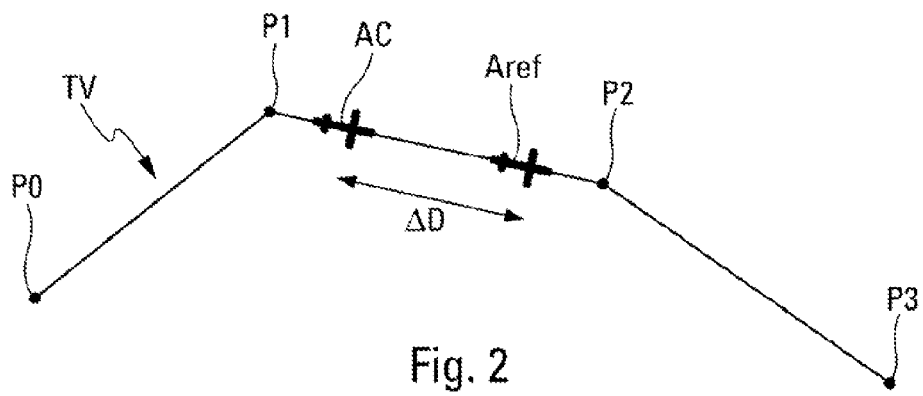
FIG. 2 is a graphic making it possible to explain the essential characteristics of the invention.

The said current offset ΔD therefore affords an indication regarding compliance or non-compliance with the time constraint. Thus:
- if the offset ΔD is zero, that is to say if the aircraft AC to be guided is situated at the theoretical position occupied by the reference aircraft Aref, the time constraint is complied with;
- if the offset ΔD is non-zero and the aircraft AC is situated to the rear of the position of the reference aircraft Aref, as represented in FIG. 2, the time constraint is not complied with and the aircraft AC must accelerate to satisfy the constraint; and
- if the offset ΔD is non-zero but the aircraft AC is situated in front of the position of the reference aircraft Aref, the time constraint is not complied with and the aircraft AC must decelerate to satisfy the constraint.

The present invention therefore envisages adopting a standpoint with respect to a reference aircraft Aref benchmark. This reference aircraft Aref defines the position that the aircraft AC must have in the course of time in order to make it possible to comply with the time constraint in an optimal manner. This reference aircraft Aref is positioned on the flight plan (trajectory TV) on the basis of the initial position (for example the point P0) of the aircraft AC (the two aircraft are presumed to start from the same location), of the time, as well as of the optimal speed of realization of the constraint (reference speed Vref) which is calculated just once, on initialization. The position of the reference aircraft Aref is therefore updated on the go along the flight plan with this optimal speed Vref which remains constant.

Thus, the present invention is not therefore based directly on the time constraint to ascertain whether the aircraft AC must accelerate or slow down as in the case of the customary solutions, but on a reference aircraft Aref which is displaced along the flight plan. In addition to this change of benchmark, the invention is no longer based on a temporal deviation but on a spatial deviation (offset ΔD) with respect to this reference aircraft Aref.

Moreover, to determine the displacement of this reference aircraft Aref, the means 12 therefore calculate the reference speed Vref just once (which is applied to the reference aircraft), and not in a repetitive manner as in the customary solutions. Consequently, through this unique calculation of the reference speed Vref (except in the case of modification of the flight plan, as specified hereinbelow), the calculation capability required to implement the invention and afford aid with the guidance of the aircraft AC is greatly reduced.

By virtue of the determination of a reference (reference aircraft Aref) and the calculation of a deviation in distance with respect to this reference, the device 1 is therefore able to indicate to the crew, via the display on the screen 16 of an indication illustrating this deviation in distance (offset ΔD), whether the aircraft AC is complying with the constraint or is early or late, so that the pilots can if appropriate perform the necessary corrective actions (accelerate or slow down).

Furthermore, to supplement the information afforded the pilot, the said display means 15 present moreover, on the viewing screen 16, at least one auxiliary means of indication (not represented) which indicates the value of the said reference speed Vref. Any mode of presentation of this value is also conceivable within the framework of the present invention, such as for example the display of a digital value or of a symbol presented on a scale.

Furthermore, in a particular embodiment, the said means 12 and 13 form part of a processing unit 18 which is integrated, preferably, into a flight management system, of FMS type, and especially into the system 5 of FIG. 3. Moreover, the display means 15 of the device 1 can correspond to the said display means 8 of the system 2.

In a preferred embodiment:
the said device 1 comprises moreover means 19, which are connected by way of a link 20 to the said means 14, which are for example part of the set 4 and which are formed so as to determine, in a customary and repetitive manner, the current speed Vac of the aircraft AC; and
the said means 13 calculate the said current offset ΔD with the aid of the following expression:

$$\Delta D = (1 - Vac/Vref) * Dref$$

in which:
Vref therefore represents the optimal theoretical flight speed along the flight plan, from an initial position to a terminal position (for example from P0 to P3), making it possible to comply with the said RTA time constraint; and
Dref represents the distance traversed at the current instant by the reference aircraft Aref from the said initial point (P0) along the said flight plan (trajectory TV).

The distances are always calculated along the flight plan (trajectory TV).

Within the framework of the present invention, the said means 13 can calculate the said distance Dref in various ways.

In particular, in a first embodiment, the said means 13 determine the said distance Dref with the aid of the following expression:

$$Dref = Vref \times tc$$

in which tc represents the current time, counted from the passing of the said initial point P0 by the reference aircraft Aref.

Furthermore, in a second embodiment, the said means 13 determine the said distance Dref with the aid of the following expression:

$$Dref = Dtot - Drest$$

in which:
Dtot represents the total distance along the flight plan between the said initial and terminal positions (P0 and P3); and
Drest represents the distance remaining to be traversed by the reference aircraft Aref along the said flight plan (trajectory TV), from its current position, to reach the said terminal position P0.

Moreover, in the case where the flight plan comprises constant-speed segments, on which it is planned that the aircraft AC flies at a constant given speed with a precise aim (tactical operation, air traffic management, etc.), the optimal speed Vref can be calculated on the basis of two types of different assumptions, leading to different managements. More particularly, in this case:

either the optimal speed takes into account the constant-speed segments by aligning with them;
or the optimal speed does not take them into account and, in this case, it is calculated without constraint: the speed is optimal from the initial position to the terminal position.

In the first situation, the reference speed is no longer constant everywhere, but it is constant per segment. Thus, the previous reasoning applies, but per segment. When the aircraft AC enters this type of segment, the crew adjusts the speed of the said aircraft AC to the speed defined for the segment and attempts to maintain a deviation consistent with the reference. As it does not stray from the reference, it is always in the optimal conditions to satisfy the time constraint.

In the second situation, as the reference does not take these segments into account, its speed is always the optimal speed. Thus, when the aircraft AC enters, in the course of its flight, one of these segments, it sees the reference (reference aircraft Aref) stray from its aircraft AC. When the segment is finished, it can adapt its speed so as to recoup the deviation and place itself back into conditions to comply with the RTA constraint.

Moreover, in the case of customary modification of the flight plan, the said means 12 determine, in a customary manner, a new reference speed that the means 13 thereafter take into account to determine the offset in distance ΔD, in place of the speed reference considered previously.

Consequently, by virtue of the display on the screen 16 of a means of indication presenting this datum ΔD, a crew member knows the spatial deviation between the aircraft AC and the reference aircraft Aref, thereby making it possible to ascertain whether the aircraft AC is late or early or else whether it is complying with the RTA constraint, and thus allows the pilot to manage the time constraint. More precisely, to be able to comply with the said time constraint:
if ΔD<0: it is necessary to slow the aircraft AC;
if ΔD>0: it is necessary to accelerate the aircraft AC;
if ΔD=0: the aircraft AC must maintain its speed.

The invention claimed is:
1. A method for aiding guidance of an aircraft to be guided and having to comply with at least one time constraint requiring a given passing time at a particular waypoint of a flight plan of the aircraft, comprising, in an automatic manner:
determining, by a flight computer system, a reference speed which, if maintained by the aircraft along the flight plan, would cause the aircraft to be guided to comply with the time constraint;
simulating, by the flight computer system, a reference aircraft, including simulating a flight of the reference aircraft along the flight plan at the reference speed, beginning to fly at the same instant and the same position as the aircraft to be guided and continuing to fly along the same flight plan as the aircraft to be guided;
determining, by the flight computer system, a current offset in distance along the flight plan of the aircraft to be guided, in a course of its flight, with respect to a current simulated position of the reference aircraft that is simulated as continuing to fly along the same flight plan as the aircraft to be guided, in a repetitive manner and at a plurality of times in the course of flight of the aircraft to the particular waypoint of the flight plan of the aircraft and prior to arriving at the particular waypoint of the flight plan, on the aircraft to be guided; and indicating to a crew member of the aircraft at least the current offset in distance, by presenting the current offset on a viewing screen of the aircraft to be guided.

2. The method according to claim 1, comprising, automatically:
   determining current speed, Vac, of the aircraft to be guided in a repetitive manner; and
   calculating the current offset by integrating, with respect to time, an offset value of deviation variation determined based on:
   a first value Vref that represents optimal theoretical flight speed along the flight plan, from an initial position to a terminal position, making it possible to comply with the said time constraint; and
   a second value Dref that represents distance traversed at a current instant by the reference aircraft from the initial point along the flight plan.

3. The method according to claim 2,
   wherein the distance Dref is determined with the following expression:

Dref =Vref =tc in which tc represents current time, counted from passing of the initial position by the reference aircraft.

4. The method according to claim 2,
   wherein the distance Dref is determined with the following expression:

Dref =Dtot −Drest in which
   Dtot represents total distance along the flight plan between the initial position and the terminal position; and
   Drest represents distance remaining to be traversed by the reference aircraft along the flight plan, from its current position, in order to reach the terminal position.

5. The method according to claim 1, for a flight plan comprising constant-speed segments, wherein the reference speed exhibits one of the following characteristics:
   it is constant between an initial position and a terminal position;
   it is constant per segment, on segments of the flight plan.

6. The method according to claim 1, wherein, in case of modification of the flight plan, a new reference speed is determined and is thereafter taken into account to determine offset in distance.

7. The method according to claim 1, wherein at least one auxiliary indicator indicating the reference speed is presented on the viewing screen.

8. A device for aiding guidance of an aircraft to be guided and having to comply with at least one time constraint requiring a given passing time at a particular waypoint of a flight plan, wherein the device comprises a processing unit configured to:
   automatically determine a reference speed which, if maintained by the aircraft to be guided along the flight plan, would cause the aircraft to be guided to comply with the time constraint;
   automatically determine, in a repetitive manner, in a course of flight of the aircraft to be guided to the particular waypoint of the flight plan and at a plurality of times prior to arriving at the particular waypoint of the flight plan, a current offset in distance along the flight plan with respect to a reference aircraft that is simulated as continuing to fly along the same flight plan as the aircraft to be guided, the reference aircraft being a simulated aircraft which is simulated to fly along the flight plan at the reference speed, beginning to fly at a same instant and same position as the aircraft to be guided and continuing to fly along the same flight plan as the aircraft to be guided; and
   automatically present, on a viewing screen, at least one indicator to indicate to a crew member of the aircraft the current offset in distance.

9. An aircraft to be guided, comprising:
   a viewing screen; and
   a processing unit configured to:
      automatically determine a reference speed which, if maintained by the aircraft to be guided along a flight plan, would cause the aircraft to be guided to comply with a time constraint;
      automatically determine, in a repetitive manner, in a course of flight of the aircraft to be guided to a particular waypoint of the flight plan and at a plurality of times prior to arriving at the particular waypoint of the flight plan, a current offset in distance along the flight plan with respect to a reference aircraft that is simulated as continuing to fly along the same flight plan as the aircraft to be guided, the reference aircraft being a simulated aircraft which is simulated to fly along the flight plan at the reference speed, beginning to fly at a same instant and same position as the aircraft to be guided and continuing to fly along the same flight plan as the aircraft to be guided; and
      automatically present, on the viewing screen, at least one indicator to indicate to a crew member of the aircraft the current offset in distance.

* * * * *